United States Patent Office 2,742,730
Patented Apr. 24, 1956

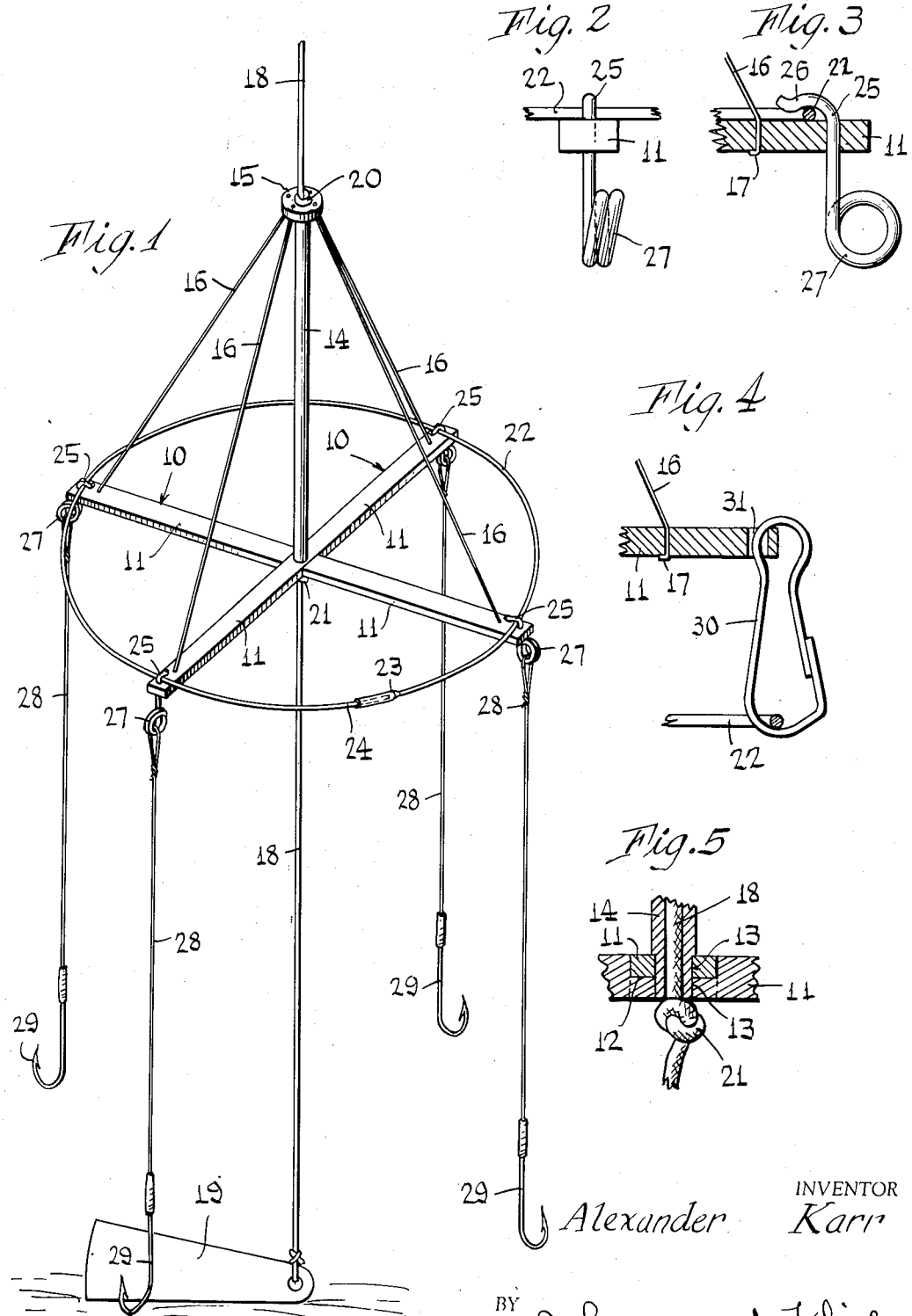

2,742,730

CHUM RIG FOR FISHING AND CRABBING

Alexander Karr, Bridgeport, Conn.

Application January 22, 1953, Serial No. 332,718

6 Claims. (Cl. 43—42.74)

This invention relates to fishing rigs and more particularly to those in which provision is made to lure fish and/or crabs and the like to a position where they may be caught.

A feature of the present invention is the provision of a line-carried rig having means on which may be impaled pieces of fish chum such as minnows, shrimp, clam, meat, rind, or any other substance which will attract fish or swimming crustacea to the rig.

When the rig is to be used to actually catch fish, provision is made for attaching leaders for baited hooks to the rig and in this situation fish are attracted to the vicinity by the chum. The chum may thus be in larger quantity than the bait and will more readily attract the fish to the vicinity of the baited hooks which, being on a flexible leader, move to and fro in the currents and give the appearance of animation causing the fish to strike and be caught.

When the rig is to be used to lure crabs or other swimming shell fish, it may be used without baited hooks and with tougher pieces of chum to which crabs or the like, due to their tenacity, cling and may be brought toward the surface to be netted.

In the form of the invention herein described the rig, comprises a spreader having a plurality of arms, preferably four, which may be joined crosswise and which are secured to the fishing line. A length of wire, preferably stainless steel spring wire, is detachably connected to the ends of the spreader arms so as to constitute the arcuate parts of sectors between them. The ends of the length of wire are detachably connected and being springy will form a substantially circular ring carried by the ends of the spreader arms. The rig may also include a tube extending upwardly from the intersection of the spreader arms and having at its upper end stay wires extending to the outer end portions of the spreader arms so that the ring will lay in a plane at right angles to the plane of the fishing line which extends through the tube and the spreader arms, being located in a desired position on the line by knots or other enlargements carried by the line. The spreader arms also may carry snap hooks, wire loops, or other means for attaching flexible leaders attached to fish hooks. By placing a sinker or lead at the desired place on the portion of the line below the rig, the location of the chum ring relative to the bottom, when the line is held taut, may be controlled.

In the accompanying drawings which illustrate one form of my invention with several modifications as to details:

Figure 1 is a perspective view showing the rig of the present invention as used with fish hooks.

Fig. 2 is an edge view showing one form of means for holding the chum ring on the spreader and also for securing the hook leaders hereto.

Fig. 3 is a side view of the parts shown in Fig. 2.

Fig. 4 is a view similar to Fig. 3 showing a modified form of the invention in which the chum ring is carried by snap hooks carried by the ends of the spreader arms, which snap hooks may also carry the hook-leaders.

Fig. 5 shows the manner in which the tube extends through the crossed spreader arms and showing the knot in the line which supports the rig on the line.

As shown in the accompanying drawings the rig of the present invention comprises a spreader having two cross bars 10 to form four arms 11, 90° apart. At their intersections the bars are mortised at 12 to permit both bars to lay in the same plane, the mortised portions interlocking so that the arms 11 remain at right angles to each other. The bars 10 at their intersection have apertures 13 through which extends the reduced end of a tube 14 the upper end of which is provided with a flange 15. Wires 16 are secured to the flange 15 and extend down to and through the end portions of the arms 11 where they are bent or headed over at 17 in any suitable manner. The wires 16 hold the tube 14 perpendicular to the bars 10.

In the form shown the rig is attached to the fish line 18 by passing the line through the tube 14 to the underside of the spreader. As shown the lower end of the line may be secured to a sinker or weight 19. The position of the rig on the line may be determined by an upper knot 20 engaging the disk 15 and a lower knot 21 engaging the lower end of the tube 14 and the adjacent cross bars 10.

To attract fish to the vicinity of the rig, the rig of the present invention is provided with a length 22 of spring wire, preferably of stainless steel so as to be non-corrosive, and one end of the wire is provided with a socket 23 into which the other end of the wire 24 may be slid to make a substantially circular ring. This ring is detachably carried by the spreader arms.

In the form of the invention shown in Fig. 3, pieces of wire 25 are press fitted into holes in the end portions of the spreader arms 11 and are shaped to form hooks 26, between which and the adjacent surface of the spreader arms the wire ring 22 may be snapped. In addition to performing this function the wires 25 may have their other ends coiled to provide the usual form of coiled wire eyes 27 for receiving the looped ends of leaders 28 for fish hooks 29.

As shown in Fig. 4 the ring of wire 22 is not mounted above the spreader arms, as in the forms shown in Figs. 1, 2 and 3, but is carried by snap hooks 30 which extend through holes 31 in the end portions of the arms 11 and hang pendent from the spreader arms, the ring of wire 22 laying in the lower loop of the snap hooks 30.

To bait the rig of the present invention, the ring of wire 22 is snapped from under the hooks 26 to free it from the spreader. Then the end 24 of the wire is slid out of the socket 23, and the end 24 is threaded through pieces of fish chum or other fish attracting substance until the desired quantity has been strung. The end 24 of the wire is then returned to the socket 23 to form the ring and then the ring is returned to the spreader arms by being snapped under the hooks 26, the chum being pushed aside to clear the spreader arms. The operation just described may be altered to the extent that the ends 23 and 24 of the wire may be separated and rejoined either before or after the wire is snapped under the hooks 26.

In the case of the form of the invention shown in Fig. 4, the wire 22 with the chum impaled on it is formed into a ring by uniting the ends 23 and 24 and then the ring is snapped into the snap hooks 30.

When the rig is to be used for fishes which take a baited hook the leaders 28 are attached to the loops 27 (Fig. 1) or the snap hook 30 (Fig. 4) and bait is applied to the ends of the hook 29.

However, when fishing for crabs and other shell fish of this type, the leaded-hooks are omitted and the rig is simply used to bring the crabs, etc., to the surface where they can be netted.

Variations and modifications may be made within the scope of the claims and portions of the improvements may be used without others.

I claim:

1. A chum rig comprising a spreader arm structure attachable to a fishing line; a wire connected to the spreader arms at points spaced from the attachment of the fishing line and readily detachable from the arms without the use of tools, said wire constituting the arcuate parts of sectors between the arms and being sufficiently thin and stiff to impale pieces of fish chum and support the same in position spaced from the line, to lure fish and crabs to the rig; and means on said arms for attaching hook leaders.

2. A chum rig comprising a spreader structure having a plurality of radiated arms attachable at their centers to a fishing line; a length of spring wire in the form of a loop, connected to the ends of said arms and readily detachable from the arms without the use of tools, said wire constituting the arcuate parts of the sectors between each of the arms; and means for detachably securing the ends of the length of wire together to form a continuous ring, said wire being sufficiently thin and stiff to impale pieces of fish chum and support the same in position to lure fish and crabs to the rig.

3. A chum rig comprising a spreader having outwardly-extended arms attachable to a fishing line; a length of wire in the form of a loop, connected to the ends of said arms and readily detachable from the arms without the use of tools, said wire constituting the arcuate parts of sectors between the arms; means for detachably connecting to each other the ends of the length of wire to form a continuous ring, said wire being sufficiently thin and stiff to impale pieces of fish chum and support the same in position to lure fish and crabs to the rig; and means connected with the wire ring, for holding the ring substantially horizontal when the said arms are hung on the fishing line.

4. A chum rig comprising a spreader having cross arms attachable at their intersections to a fishing line; a length of wire in the form of a loop connected to the ends of said arms and readily detachable from the arms without the use of tools, said wire constituting the arcuate parts of sectors between the arms; coupling means separable without the use of tools, for connecting to each other the ends of the length of wire to form a continuous ring, said wire being sufficiently thin and stiff to impale pieces of fish chum and support the same in position to lure fish and crabs to the rig; and hook-leader attaching means carried by the spreader arms.

5. The invention as defined in claim 11 in which said arms intersect each other and at their intersection are apertured, and in which there is a stiff tube rising from said apertures, in which there is a flange at the top of said tube, and in which the means holding the ring horizontal includes steadying wires extending from said flange to the end portions of said arms to hold the spreader horizontal when the tube is vertical, the fishing line extending through said tube and the apertures in the arms, and having enlargements to engage the top of the tube and the bottom of the spreader to locate the rig at a predetermined place on the line.

6. A chum rig comprising a spreader having connected cross-arms attachable to a fishing line; means connected to the ends of the cross-arms, for holding the arms horizontal when hung on a fishing line; a thin, flexible metal wire ring constituting arcuate parts of sectors between said arms on which chum may be impaled, having a separable connector joining the ends of the wire; clip means carried by the end portions of the spreader arms for removably attaching said chum ring thereto without the use of tools; and means for attaching hook-leaders to the ends of the cross-arms.

References Cited in the file of this patent

UNITED STATES PATENTS

| 288,853 | Poage | Nov. 20, 1883 |
| 1,210,932 | Halliday | Jan. 2, 1917 |
| 1,709,298 | Zoppa | Apr. 16, 1929 |
| 2,122,836 | Gegerfeldt | July 5, 1938 |
| 2,289,663 | Linhares | July 14, 1942 |
| 2,509,704 | Streitwieser | May 30, 1950 |
| 2,538,676 | Enright | Jan. 16, 1951 |
| 2,565,163 | Ball | Aug. 21, 1951 |
| 2,634,540 | Nelson et al. | Apr. 14, 1953 |

FOREIGN PATENTS

| 8,358 | Great Britain | 1911 |
| 87,247 | Germany | 1896 |
| 782,511 | France | 1935 |